United States Patent [19]
Robinson

[11] Patent Number: 5,383,042
[45] Date of Patent: Jan. 17, 1995

[54] 3 LAYER LIQUID CRYSTAL NEURAL NETWORK WITH OUTPUT LAYER DISPLAYING ERROR VALUE FOR OPTICAL WEIGHT UPDATING

[75] Inventor: Michael G. Robinson, Oxfordshire, United Kingdom

[73] Assignee: Sharp Kabushiki Kaisha, Osaka, Japan

[21] Appl. No.: 60,353

[22] Filed: May 11, 1993

[30] Foreign Application Priority Data

May 11, 1992 [GB] United Kingdom ............... 9210080

[51] Int. Cl.$^6$ .................. G06E 3/00; G02F 1/133; G02F 1/135
[52] U.S. Cl. .................. 359/72; 359/53; 359/107; 359/108; 395/25; 364/822
[58] Field of Search ........ 359/72, 84, 107, 108, 359/53; 307/201; 395/25; 364/822

[56] References Cited

U.S. PATENT DOCUMENTS

| | | | |
|---|---|---|---|
| 4,937,776 | 6/1990 | Myers et al. | 364/736 |
| 4,959,532 | 9/1990 | Owechko | 250/201.9 |
| 4,963,725 | 10/1990 | Hong et al. | 359/107 |
| 5,004,309 | 4/1991 | Caulfield et al. | 359/107 |
| 5,028,102 | 7/1991 | Ogura et al. | 359/107 |
| 5,235,440 | 8/1993 | Clark et al. | 395/25 |
| 5,268,679 | 12/1993 | Shannon | 364/822 |

FOREIGN PATENT DOCUMENTS

WO9009641 8/1990 WIPO.
WO9107714 5/1991 WIPO.

OTHER PUBLICATIONS

Paek et al, "VanderLugt Correlator and Neural Networks", pp. 408–414, 1989 IEEE Intl. Conf. on Systems, Man, and Cybernetics, Nov. 14–17, 1989.
"Network Analysis of an Optically Implemented Connectionist Architecure", Robinson et al, International Neural Network Conference, Jul. 9–13, 1990, vol. II, pp. 603–606.
"Motivations for Using Ferroelectric Liquid Crystal Spatial Light Modulators in Neurocomputing", *Applied Optics*, vol. 28, No. 22, Nov. 15, 1989, pp. 4888–4899.
Killinger et al, *Ferroelectrics*, 1991, vol. 122, pp. 89–99, "Controlling the Grey Level Capacity of a Bistable FLC Spatial Light Modulator".
Robinson et al, *Applied Optics*, Jan. 10, 1992, vol. 31, No. 2, "Noise Analysis of Polarization-Based Optoelectronic Connectionst Machines".
Goodman et al, *Optics Letters*, Jan. 1978, vol. 2, No. 1, "Fully Parallel, High-Speed Incoherent Optical Method for Performing Discreet Fourier Transforms".

*Primary Examiner*—William L. Sikes
*Assistant Examiner*—Kenneth Parker
*Attorney, Agent, or Firm*—Renner, Otto, Boisselle & Sklar

[57] ABSTRACT

An optical information processor for use as a matrix vector multiplier comprises a vector input spatial light modulator (1) and an optically addressed weight matrix spatial light modulator (3). A read beam (10) passes through the input modulator (1) and the weight modulator and onto a combined output transducer and error spatial light modulator (5). The error modulator (5) is then controlled in accordance with the difference between a target output vector and the output vector from the transducer (5), and modulates an update beam (11) which then passes through the input modulator (1) and onto the weight modulator (3). The weight modulator (3) represents a two-dimensional array of optical attenuation values which are updated in accordance with the optical radiation incident thereon during updating.

18 Claims, 2 Drawing Sheets

3 LAYER LIQUID CRYSTAL NEURAL NETWORK WITH OUTPUT LAYER DISPLAYING ERROR VALUE FOR OPTICAL WEIGHT UPDATING

The present invention relates to an optical information processor. Such a processor may be used, for instance, in neural networks or other applications where matrix-vector multiplications are required.

Neural networks are generally based on matrix-vector multiplications in which "interconnection weights" are defined by the elements of a matrix. Such networks have various applications, for instance in the field of pattern recognition, where conventional data processors have proved to be ineffective or inefficient.

Neural networks have to be trained for a particular application by applying input data and varying the interconnection weights so as to achieve desired output data. The input data used for training represent a subset of the input data which the neural network will be expected to process correctly when trained.

For many applications, it is necessary to have large networks with correspondingly large numbers of interconnection weights which have to be adapted during training. Although known electronic implementations, such as suitably programmed conventional electronic data processors, are possible, training occurs in essentially a serial way and is therefore very time-consuming. For large networks, such electronic implementations are insufficient because of interconnection limitation, namely limitations on band width, synaptic complexity, power dissipation, and pin-out numbers of integrated circuits.

It is known to embody a neural network by means of an optical processor in which the interconnection weights are defined by optical attenuation in a spatial light modulator. Such an implementation can provide a network which offers rapid parallel data processing and achieves substantial advantages in terms of processing speed over electronic implementations. However, serial updating of interconnection weights in such known systems causes training time to be unacceptably large, being proportional to the product of the numbers of elements of input and output vectors in a matrix-vector multiplier.

M. Killinger, J. L. de Bougrenet de la Tocnaye and P. Cambon disclose, in Ferroelectrics, 1991 Vol. 122, pp. 89-99, a neural network which permits parallel updating of interconnection weights. The network comprises three spatial light modulators (SLMs) together with optics and light sources. The first SLM is optically addressed and contains the interconnection weights. The second SLM can be addressed optically or electrically and contains the input vector. The third SLM is optically addressed and stores the result of thresholding the vector-matrix product of the input vector and the weight matrix.

During weight updating, the result of the computation is optically fed back and multiplied by the input vector. The result of this multiplication is optically applied to the first SLM so as to update the interconnection weights. Thus, updating takes place optically in parallel.

This arrangement is of limited application because the ouput stored in the third SLM can only be read optically. Further, this arrangement is only capable of performing unsupervised training in that it cannot be trained to provide a predetermined or desired output in response to a spcified input.

According to the present invention, an optical information processor is provided including a first spatial light modulator for containing interconnection weight data, a second spatial light modulator for containing input data, and a third spatial light modulator, the first spatial light modulator being optically addressable, the first, second, and third spatial light modulators defining an optical update path for updating of weight data from the third spatial light modulator via the second spatial light modulator to the first spatial light modulator, characterised in that the third spatial light modulator further comprises optoelectric transducer means co-operating with the first and second spatial modulators to define an optical processing path from the first spatial light modulator via the second spatial light modulator to the optoelectric transducer means, processing means for processing output data from the optoelectric transducer means and predetermined target output data to form error data, and control means for controlling the third spatial light modulator to contain the error data during weight updating.

According to a particular embodiment of the present invention, the processing means is arranged to calculate the error data as the difference between the output data and the predetermined target output data.

According to another embodiment of the present invention, the second spatial light modulator is a first liquid crystal device.

In accordance with yet another embodiment of the present invention, the first liquid crystal device is a ferroelectric liquid crystal device.

According to another embodiment of the present invention, the third spatial light modulator is a second liquid crystal device.

In accordance with yet another embodiment of the present invention, the second liquid crystal device is a ferroelectric liquid crystal device.

According to another embodiment of the present invention, the first spatial light modulator is a third crystal device.

In accordance with yet another embodiment of the present invention, the third liquid crystal device is a ferroelectric liquid crystal device.

According to another embodiment of the present invention, the third liquid crystal device comprises a photo-electron source and biasing means for selectively injecting electrons from the source into the ferroelectric liquid crystal device.

In accordance with yet another embodiment of the present invention, the photo-electron source comprises amorphous silicon.

According to another embodiment of the present invention, the biasing means comprises means for applying a potential difference across the ferroelectric liquid crystal of the device.

In accordance with yet another embodiment of the present invention, the first spatial light modulator comprises a two-dimensional array of elements.

According to another embodiment of the present invention, the second spatial light modulator comprises a plurality of elongate parallel elements.

In accordance with yet another embodiment of the present invention, the third spatial light modulator comprises a plurality of elongate parallel elements.

According to another embodiment of the present invention, the transducer means comprise a plurality of elongate parallel transducer elements.

In accordance with yet another embodiment of the present invention, the second spatial light modulator comprises a two-dimensional array of elements, each of which corresponds to a plurality of the elements of the first spatial light modulator.

According to another embodiment of the present invention, the third spatial light modulator comprises a two-dimensional array of elements, each element of the second spatial light modulator corresponding to a plurality of the elements of the third spatial light modulator.

In accordance with yet another embodiment of the present invention, the transducer means comprise a two-dimensional array of transducer elements, each element of the second spatial light modulator corresponding to a plurality of the transducer elements.

It is thus possible to provide an optical information processor which is capable of supervised training and in which updating of interconnection weights can be performed effectively in parallel. Thus, training time is greatly reduced and is substantially independent of the number of interconnection weights. Use of an optically addressed spatial light modulator for the interconnection weights removes or greatly reduces optical alignment problems during manufacture of the processor. By arranging for read and update paths to correspond optically with each other and by using an optically addressed spatial light modulator in which the optical attenuation cells are defined by light which is incident on the modulator, self-alignment can be achieved.

The invention will be further described, by way of example, with reference to the accompanying drawings, in which.

Figure 1:
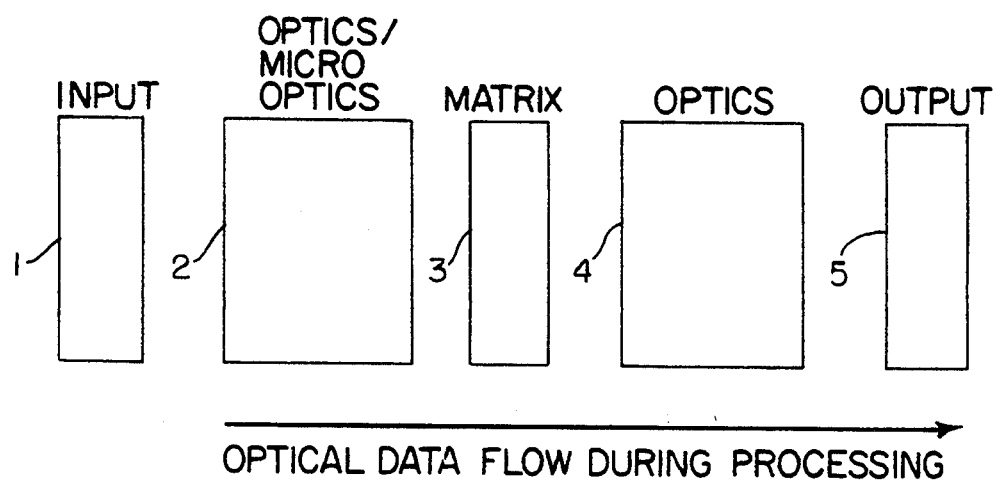
FIG. 1 is a diagram illustrating optical data flow during processing for a known type of optical information processor.

The known type of processor illustrated in FIG. 1 comprises an input device 1 in the form of a spatial light modulator for encoding an input vector as a plurality of cells whose light attenuation properties correspond to the components of the input vector. Such components may, for instance, be binary digits or analogue values. Optical radiation, such as visible light or infrared radiation, in the form of a collimated beam passes through the modulator 1 and via suitable optics or micro optics 2 onto a two-dimensional spatial light modulator 3 whose optical attenuation cells represent the values of the elements of a weight matrix. Light modulated by each of the elements of the input vector in the modulator 1 is "fanned out" so as to pass through, for instance, a row of cells of the modulator 3.

The modulated light from the modulator 3 then passes through further optics 4 and onto an output transducer 5. The light or other optical radiation is "fanned in" to the transducer 5 in a direction substantially perpendicular to the fanning out from the modulator 1 to the modulator 3 so that the transducer 5 produces electrical output signals representing the elements of an output vector which represents the product of the input vector and the weight or interconnection matrix.

In the known type of processor illustrated in FIG. 1, the interconnection weights of the matrix represented by the spatial light modulator 3 are updated serially during the training phase of the processor when used, for instance, as a neural network. Thus, this updating of matrix elements requires considerable time and is substantially equal to the product of the number of matrix elements and the time required for updating each of these elements. Further, accurate optical alignment of the devices shown in FIG. 1 is necessary in order to ensure correct operation of the processor. Manufacturing difficulties and cost of manufacture of the processor are therefore substantial.

Figure 2:
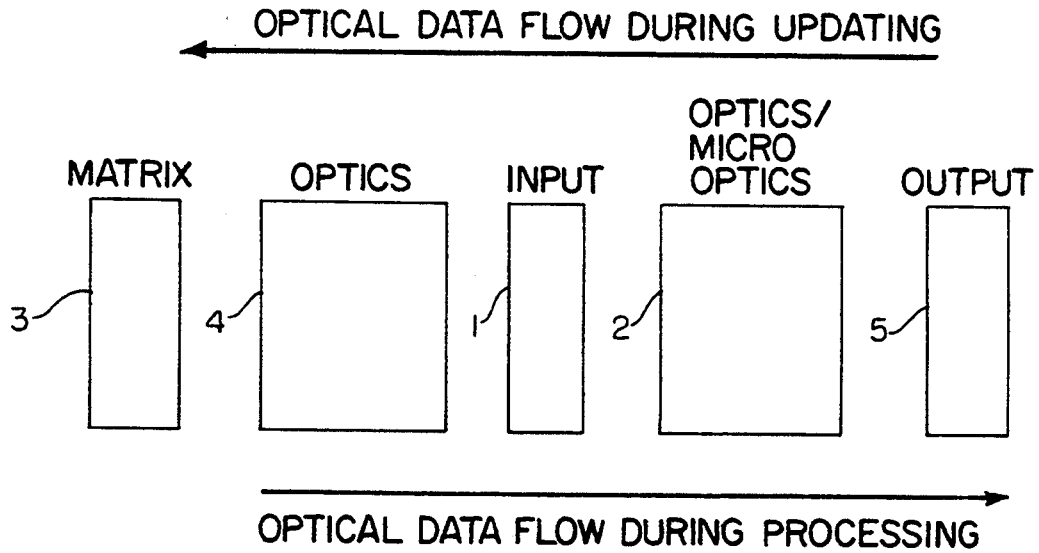
FIG. 2 is a diagram similar to that of FIG. 1 showing optical data flow during processing and updating for an optical information processor constituting an embodiment of the present invention.

The optical information processor shown in FIG. 2 differs from that in FIG. 1 in several ways. The order of the devices is changed such that, during processing, the optical radiation flows through the spatial light modulator 3 representing the interconnection weight matrix and via the optics 4 to the spatial light modulator 1 representing the input vector. Because of the commutative nature of the vector-matrix multiplication, the order of the devices 1 and 3 can be reversed without affecting the information processing. The modulated optical radiation from the modulator 1 then passes through the optics or micro optics 2 and to the output device 5 which includes a transducer.

Updating of the matrix elements represented by the modulator 3 is acheived optically by means of collimated optical radiation flowing in the reverse direction. During the training phase, the device 5 calculates the error, for instance as the difference between the output vector and a target vector. The elements of the resulting error vector are used to control a spatial light modulator forming part of the device 5 so that the error vector modulates the optical radiation during updating. The modulated radiation passes through the modulator 1 so as to form the product of the error vector and the input vector, and this is applied to the modulator 3 where it is used to update the matrix elements in parallel. The modulator 3 is optically addressed and updating of each cell is performed in accordance with the amount of radiation incident on the cell during updating.

Thus, the elements of the interconnection matrix are updated in parallel so that the time required for each update operation is substantially equal to the update time for a single cell irrespective of the number of cells forming the two-dimensional matrix. Further, no special alignment constraints are placed on the modulator 3 since the individual cells are defined by the light flow during processing and updating and the light flows follow resiprocal paths. Thus, complexity and cost of manufacture are greatly reduced compared with a known processor of the type shown in FIG. 1.

Figure 3:
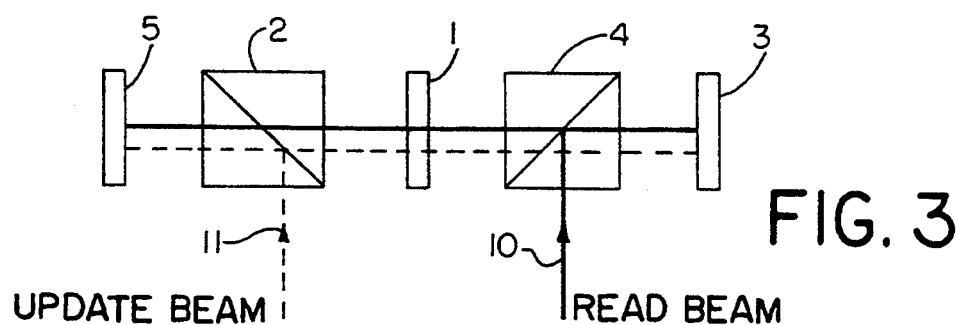
FIG. 3 is a diagrammatic plan view of an optical information processor constituting an embodiment of the invention.

The embodiment shown in FIG. 3 corresponds to that illustrated diagrammatically in FIG. 2 but illustrates a modified an possibly bore practical arrangement for the optical paths for processing or "read" and update beams. Although colimated beams are required, these are illustrated diagrammatically as single ray paths in FIG. 3.

The optics 2 and 4 comprise beam splitters for the update beam and the read beam, repectively. The arrangement of the modulators 1 and 3 and the device 5 are otherwise as shown in FIG. 2.

During processing or reading, the read beam 10 is directed into the beam splitter 4, for instance of the split prism type, and is reflected onto the spatial light modulator 3 representing the interconnection weight matrix. The read beam is modulated by the modulator 3 and reflected back along the same ray path and though the beam splitter 4 onto the input vector spatial light modulator 1. Light modulated by the modulator 1 then passes directly through the beam splitter 2 and onto the device 5, which produces the output vector corresponding to the product of the input vector and weight matrix represented by the modulators 1 and 3, respectively.

During the training phase, the device 5 subtracts the output vector from a target vector so as to produce an error vector which is applied to an error spatial light modulator disposed on the surface of the device 5 facing the beam splitter 2. DUring updating, the update beam 11 enters the beam splitter 2 and is directed onto the error spatial light modulator where it is modulated by the error vector and reflected back through the beam splitter 2 to the input vector modulator 1. The update beam then passes through the beam splitter 4 and is incident on the spatial light modulator 3. The light received by the modulator 3 thus represents the vector product of the error vector and the input vector and is used to update the weight matrix elements.

The spatial light modulator 3 is an optically addressed ferroelectric liquid crystal spatial light modulator combined with a layer of amorphous silicon and suitable electrodes to permit updating to be performed. The regions of the spatial light modulator are thus not committed or predefined by the construction. Instead, the individual cells representing the matrix elements are defined by the light which is incident on the device 3. Thus, no special alignment measures are needed, the device 3 essentially being self-aligning with the other devices of the processor.

During updating of the matrix elements, the update beam modulated to form the matrix is incident on the amorphous silicon layer and causes electrons to be released in those regions which are exposed to radiation. By applying appropriate potential differences across the ferroelectric liquid crystal and amorphous silicon layers, electrons are injected into the liquid crystal to increment or decrement the light attenuation values of the cells which have been defined and addressed optically.

Figure 4:
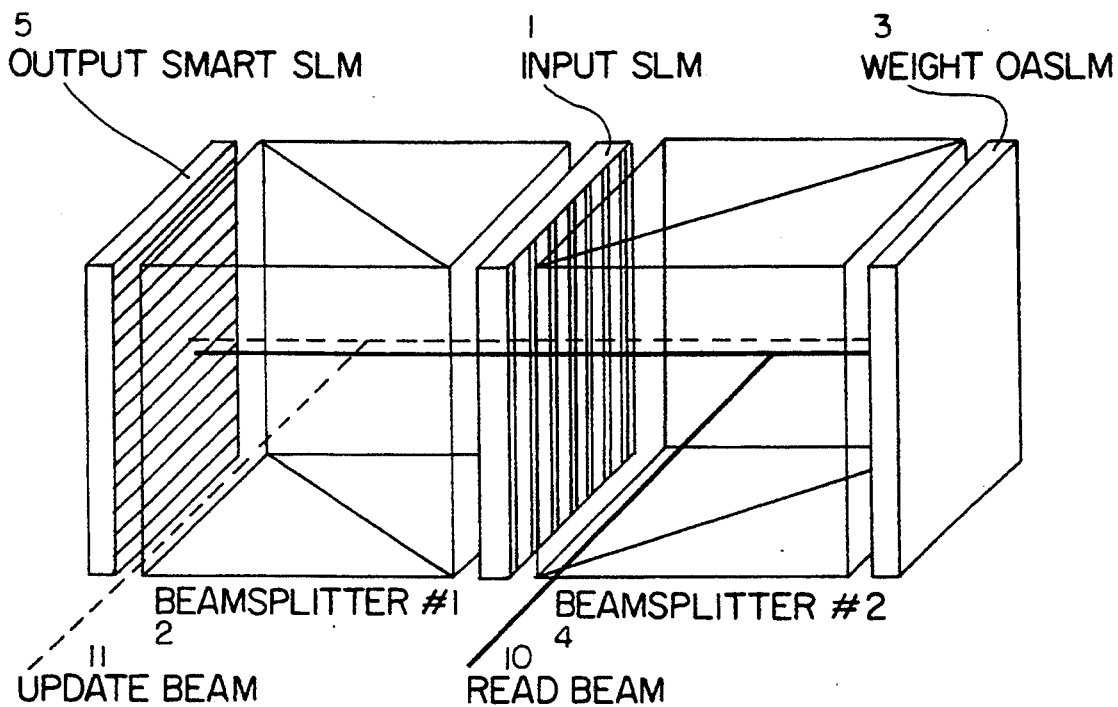
FIG. 4 is a diagrammatic perspective view of the processor of FIG. 3.

The input spatial light modulator 1, as shown in FIG. 4, comprises a ferroelectric liquid crystal display comprising a plurality of elongate parallel elements corresponding to the components of the input vector. These elements are aligned parallel to a first dimension of the two dimensional spatial light modulator forming the device 3. The device 5 also comprises a ferroelectric liquid crystal display and an optoelectric transducer having elongate light modulating and transducing elements aligned parallel to the other dimension of the device 3. Each of the devices 3 and 5 may be formed as an integral hybrid device using various known techniques. For instance, the transducer cells and electronics of the device 5 may be formed by means of very large scale integrated circuit technology with the ferroelectric liquid crystal display being subsequently formed on one surface by means of hybrid techniques.

Figure 5:
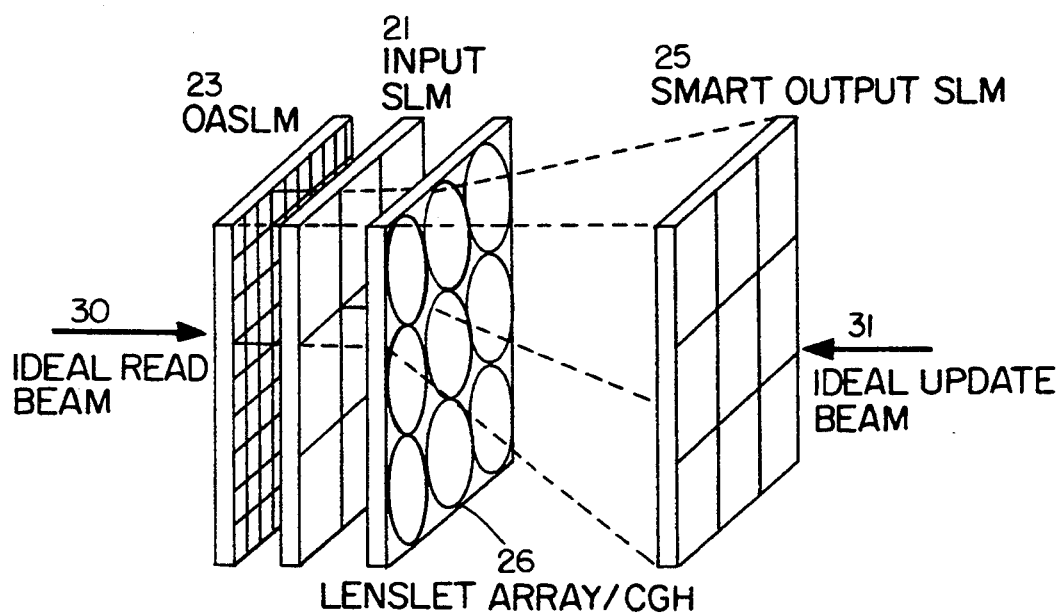
FIG. 5 illustrates part of an optical information processor constituting another embodiment of the invention.

FIG. 5 illustrates diagrammatically part of a processor of the same type as that shown in FIGS. 3 and 4 but arranged to perform matrix-matrix multiplication. In FIG. 4, the devices 1 and 5 are essentially one-dimensional and are used for representing or reading vectors. In FIG. 5, these devices are replaced by two-dimensional devices so that the input spatial light modulator 21 represents an input matrix as a two-dimensional array of light-attenuating cells. The output device 25 likewise comprises a two-dimensional array of spatial light modulator cells and optoelectric transducer elements. The devices 21 and 25 are separated by a lenslet array 26 comprising a plurality of converging lenses, each of which corresponds to and is aligned with one of the cells of the input modulator 21 and corresponds to and is aligned with a sub-array of the device 25.

Although the optically addressed spatial light modulator 23 does not need to differ in construction from the device 3 of FIG. 4, the lenslet array 26 effectively images the sub-array via the modulator 21 so that each element of the modulator 21 corresponds to and is aligned with a sub-array of cells of the modulator 23.

The read and update beams 30 and 31, respectively, are shown as idealised beams in FIG. 5 to illustrate that the optical data flows correspond to those illustrated in FIG. 2. Although the devices 21, 25, and 26 require aligning during manufacture, the optically addressed spatial light modulator 23 is effectively self-aligning so that manufacture of the processor is simplified.

I claim:

1. An optical information processor comprising a first spatial light modulator (3, 23) for containing interconnection weight data, a second spatial light modulator (1, 21) for containing input data, and a third spatial light modulator (5, 25), the first spatial light modulator (3, 23) being optically addressable, the first, second, and third spatial light modulators (1, 3, 5, 21, 23, 25) defining an optical update path for updating of weight data from the third spatial light modulator (5, 25) via the second spatial light modulator (1, 21) to the first spatial light modulator (3, 23), characterised in that the third spatial light modulator (5, 25) further comprises optoelectric transducer means co-operating with the first and second spatial light modulators (1, 3, 21, 23) to define an optical processing path from the first spatial light modulator (3, 23) via the second spatial light modulator (1, 21) to the optoelectric transducer means, processing means for processing output data from the optoelectric transducer means and predetermined target output data to form error data, and control means for controlling the third spatial light modulator to contain the error data during weight updating.

2. A processor as claimed in claim 1, characterised in that the processing means is arranged to calculate the error data as the difference between the output data and the predetermined target output data.

3. A processor as claimed in claim 1 or, characterised in that the second spatial light modulator (1, 21) is a first liquid crystal device.

4. A processor as claimed in claim 3, characterised in that the first liquid crystal device (1, 21) is a ferroelectric liquid crystal device.

5. A processor as claimed in claim 1, characterised in that the third spatial light modulator (5, 25) is a second liquid crystal device.

6. A processor as claimed in claim 5, characterised in that the second liquid crystal device is a ferroelectric liquid crystal device.

7. A processor as claimed in claim 1, characterised in that the first spatial light modulator (3, 23) is a third liquid crystal device.

8. A processor as claimed in claim 7, characterised in that the third liquid crystal device is a ferroelectric liquid crystal device.

9. A processor as claimed in claim 8, characterised in that the third liquid crystal device comprises a photo-electron source and biasing means for selectively injecting electrons from the source into the ferroelectric liquid crystal device.

10. A processor as claimed in claim 9, characterised in that the photo-electron source comprises amorphous silicon.

11. A processor as claimed in claim 9 or, characterised in that the biasing means comprises means for applying a potential difference across the ferroelectric liquid crystal of the device.

12. A processor as claimed in claim 1, characterised in that the first spatial light modulator (3, 23) comprises a two-dimensional array of elements.

13. A processor as claimed in claim 12 or, characterised in that the third spatial light modulator (5) comprises a plurality of elongate parallel elements.

14. A processor as claimed in any one of claim 12, characterised in that the transducer means comprise a plurality of elongate parallel transducer elements.

15. A processor as claimed in claim 12, characterised in that the second spatial light modulator (21) comprises a two-dimensional array of elements, each of which corresponds to a plurality of the elements of the first spatial light modulator (23).

16. A processor as claimed in claim 15, characterised in that the third spatial light modulator (25) comprises a two-dimensional array of elements, each element of the second spatial light modulator (21) corresponding to a plurality of the elements of the third spatial light modulator.

17. A processor as claimed in claim 15 or, characterised in that the transducer means comprise a two-dimensional array of transducer elements, each element of the second spatial light modulator (21) corresponding to a plurality of the transducer elements.

18. A processor as claimed in claim 12, characterised in that the second spatial light modulator (1) comprises a plurality of elongate parallel elements.

* * * * *

UNITED STATES PATENT AND TRADEMARK OFFICE
CERTIFICATE OF CORRECTION

PATENT NO. : 5,383,042
DATED : January 17, 1995
INVENTOR(S) : Michael G. Robinson It is certified that error appears in the above-indentified patent and that said Letters Patent is hereby corrected as shown below:

Claim 3, column 6, line 57, delete "or".
Claim 11, column 7, line 19, delete "or".
Claim 13, column 8, line 1, delete "or".
Claim 14, column 8, line 4, delete "any one of".
Claim 17, column 8, line 18, delete "or".

Signed and Sealed this

Twenty-second Day of August, 1995

Attest:

BRUCE LEHMAN

*Attesting Officer*        *Commissioner of Patents and Trademarks*